(12) United States Patent
Hong et al.

(10) Patent No.: US 12,703,307 B2
(45) Date of Patent: Aug. 11, 2026

(54) UMBRELLA STORAGE APPARATUS FOR VEHICLE

(71) Applicants: Hyundai Motor Company, Seoul (KR); Kia Corporation, Seoul (KR)

(72) Inventors: Suk Won Hong, Gyeonggi-do (KR); Gil Ju Kim, Gyeonggi-do (KR); Jong Seok Han, Gyeonggi-do (KR); Sang Hwi Yoon, Incheon (KR); Sang Man Seo, Gyeonggi-do (KR); Sang Do Park, Seoul (KR); Sang Hyeok Yun, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 352 days.

(21) Appl. No.: 18/514,020

(22) Filed: Nov. 20, 2023

(65) Prior Publication Data

US 2025/0050814 A1 Feb. 13, 2025

(30) Foreign Application Priority Data

Aug. 9, 2023 (KR) ........................ 10-2023-0104217

(51) Int. Cl.
*B60R 7/12* (2006.01)

(52) U.S. Cl.
CPC ...................................... *B60R 7/12* (2013.01)

(58) Field of Classification Search
CPC .................................. B60R 7/12; A45B 25/28
See application file for complete search history.

(56) References Cited

U.S. PATENT DOCUMENTS 4,378,888 A * 4/1983 Reed ...................... A47G 25/12 224/400
4,700,848 A * 10/1987 Fujiki ....................... B60R 7/12 211/63
4,807,920 A * 2/1989 Fujiki ....................... B60R 7/12 211/63
5,709,328 A * 1/1998 Ackeret .................... B60R 7/12 248/278.1

(Continued)

FOREIGN PATENT DOCUMENTS

CN 112277816 A * 1/2021 ............. B60N 3/104
JP 11268591 A * 10/1999 ............... B60R 7/12

(Continued)

OTHER PUBLICATIONS

Translation of CN 112277816 (Year: 2021).*
Translation of KR 10-2019-0046528 (Year: 2019).*
Translation of JP 11268591 (Year: 1999).*

*Primary Examiner* — Gregory A Blankenship
(74) *Attorney, Agent, or Firm* — Fox Rothschild LLP

(57) ABSTRACT

An umbrella storage apparatus for a vehicle may include a housing provided in an interior of the vehicle and equipped with a loading space for storing an umbrella or other accessory and in which an opening is formed; a cover installed on the housing and configured to open or close the opening; and an ejection unit provided in the loading space to elastically support the stored umbrella to be unloaded toward the opening. The umbrella storage apparatus may secure utilization of an interior space of the vehicle by storing the umbrella in an unused space of the interior of the vehicle.

19 Claims, 12 Drawing Sheets

(56) References Cited

U.S. PATENT DOCUMENTS

| | | | | |
|---|---|---|---|---|
| 5,713,627 | A * | 2/1998 | De Filippo | B60R 7/12 220/601 |
| 5,800,004 | A * | 9/1998 | Ackeret | B60R 7/12 296/37.13 |
| 8,511,733 | B2 * | 8/2013 | Blackmore | B60R 7/04 224/544 |
| 10,081,307 | B2 * | 9/2018 | Secord | B60R 7/12 |
| 2006/0028043 | A1 * | 2/2006 | Zeidman | B60R 7/12 296/37.13 |
| 2007/0241582 | A1 * | 10/2007 | McKeever | B60R 7/12 296/37.12 |
| 2009/0001749 | A1 * | 1/2009 | Johnson | B60R 7/043 296/37.15 |
| 2009/0051186 | A1 * | 2/2009 | Augustyn | B60R 7/081 296/37.13 |
| 2020/0254938 | A1 * | 8/2020 | Tena Han | B60R 7/12 |
| 2023/0415660 | A1 * | 12/2023 | Navarro Cervera | B60R 7/12 |
| 2025/0050814 | A1 * | 2/2025 | Hong | B60R 7/12 |

FOREIGN PATENT DOCUMENTS

| | | | | |
|---|---|---|---|---|
| KR | 10-1942575 | B1 | 1/2019 | |
| KR | 20190046528 | A * | 5/2019 | B60R 7/02 |

* cited by examiner

UMBRELLA STORAGE APPARATUS FOR VEHICLE

CROSS REFERENCE TO RELATED APPLICATION

The present application claims under 35 U.S.C. § 119(a) the benefit of Korean Patent Application No. 10-2023-0104217 filed on Aug. 9, 2023, the entire contents of which are incorporated by reference herein.

BACKGROUND

(a) Technical Field

The present disclosure relates to an umbrella storage apparatus for a vehicle, more particularly, to the umbrella storage apparatus which can store an umbrella or other accessory in an interior of the vehicle such as a mobility.

(b) Description of the Related Art

Mobility devices or mobility vehicles such as bicycles and kickboards are typically used both as exercise equipment for daily sports and recreation, and also for short-distance transportation in urban areas. A mobility vehicle (or "mobility") may include, for example, an electric kickboard, a delivery robot car, an electric bicycle, an electric wagon, an electric stroller, and other mobility devices/vehicles.

Generally, vehicles including mobility vehicles are provided with various devices for convenience of occupants in addition to essential components required for driving.

Among these convenience devices, a space for storing an umbrella is provided in the vehicle so that an occupant can use the umbrella in case of rain.

Such umbrella storage apparatuses are provided in various interior spaces.

As one example, when the umbrella storage apparatus is mounted on a door trim of the vehicle, an umbrella can be unloaded and used after opening a door. However, when the umbrella is stored in the door trim, it is inconvenient for the occupant to be exposed to rain as the door is opened, and when the door is damaged, the umbrella cannot be used.

In addition, when the umbrella storage apparatus is provided in the interior, due to the umbrella being exposed to the interior, the umbrella undesirably occupies the interior space so that space utilization is degraded.

In addition, even when a separate umbrella storage apparatus is provided in a trunk, the separate umbrella storage apparatus not only occupies a trunk space, but also causes inconvenience in that a user must open the trunk to unload the umbrella.

The foregoing is intended merely to aid in the understanding of the background of the present disclosure, and is not intended to mean that the present disclosure falls within the purview of the related art that is already known to those skilled in the art.

SUMMARY

Accordingly, the present disclosure provides an umbrella storage apparatus for a vehicle (e.g., a mobility), which may secure utilization of an interior space by storing an umbrella or other accessory using an unused interior space.

According to one aspect, there is provided an umbrella storage apparatus for a vehicle, which includes a housing which is provided in an interior of the vehicle and equipped with a loading space for storing an umbrella or other accessory and in which an opening for communicating with the loading space is formed, a cover installed on the housing and configured to open or close the opening, and an ejection unit provided in the loading space of the housing and configured to elastically support the stored umbrella to be unloaded toward the opening.

The housing may be provided in a lower portion of a seat or may be provided at a place which includes a console and in which a space that faces an opening of the housing and is equal to a length of the loading space is secured.

The housing may be equipped with a mounting device which is connected to a seat frame and moved together with the seat in a state of being mounted on the seat frame.

The loading space of the housing may be formed to be inclined toward the opening.

The cover may be rotatably installed at a portion of the housing, excluding a lower end of the opening, and may be formed to cover the opening.

An additional opening may be formed at a lower end of the cover, and even when the cover closes the opening, the loading space may be opened to the outside through the additional opening.

The housing may include a plurality of air flow holes formed on a surface opposite to the opening.

A heater may be further provided in the housing, and the heater may be provided to surround the loading space and may be operated to generate and provide heat to the loading space.

A fixing device may be formed around the opening in the housing, and a fastening device may be formed at the cover to be connected to the fixing device when the cover is positioned to close the opening.

The cover may be rotatably installed at the housing and installed to be elastically rotated in a direction for opening the opening.

A contact device may be formed at the housing in a direction in which the cover is opened, and thus an opened position of the cover may be limited only to a position in contact with the contact device.

The ejection unit may be provided on a side opposite to the opening in the loading space of the housing and may include an elastic member and a support.

A vehicle may include the above-described umbrella storage apparatus.

A mobility may include the umbrella storage apparatus.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
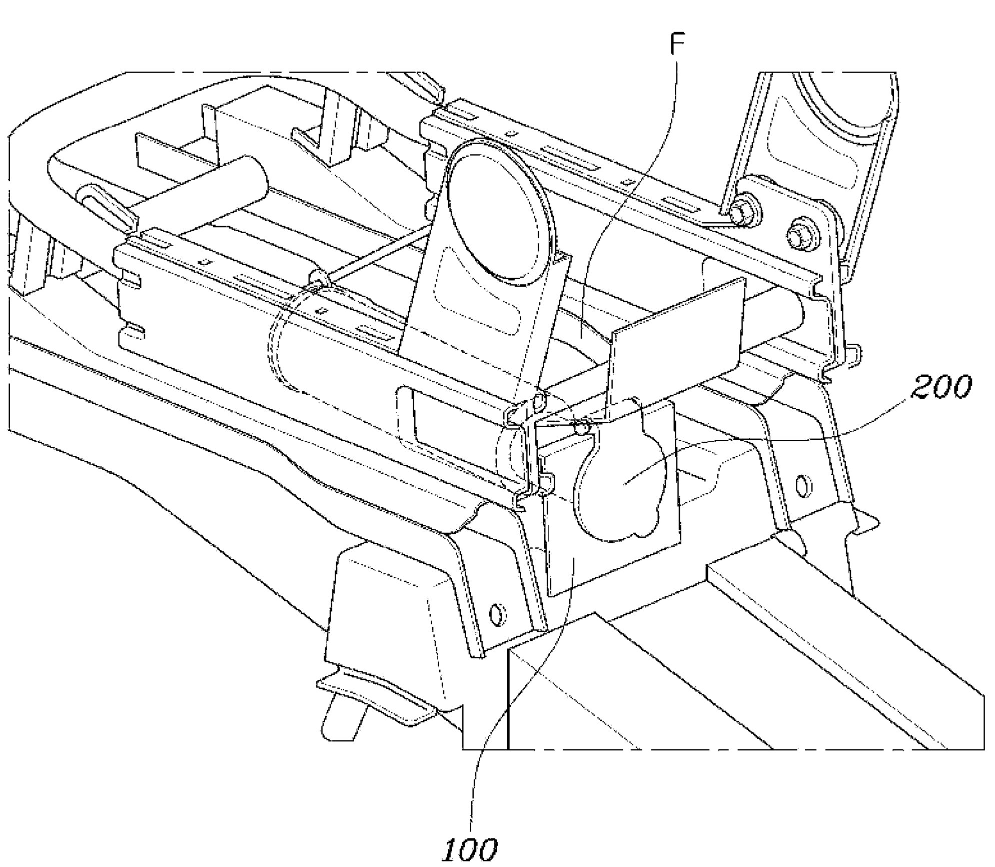
FIG. 1 is a diagram illustrating an umbrella storage apparatus for a vehicle according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", "portion" and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments disclosed in the present specification will be described in detail with reference to the drawings. The same reference numerals are given to the same or similar components regardless of reference numerals, and a repetitive description thereof will be omitted.

In describing embodiments disclosed in the present specification, when a detailed description of a known related art is determined to obscure the gist of the present specification, the detailed description thereof will be omitted herein. In addition, the accompanying drawings are merely for easy understanding of the embodiments disclosed in the present specification, the technical spirit disclosed in the present specification is not limited by the accompanying drawings, and it should be understood to include all modifications, equivalents, and substitutes included in the spirit and scope of the present disclosure.

Terms including ordinal numbers such as first, second, and the like used herein may be used to describe various components, but the various components are not limited by these terms. The terms are used only for the purpose of distinguishing one component from another component.

When a component is referred to as being "connected" or "coupled" to another component, the component may be directly connected or coupled to another component, but it should be understood that sill another component may be present between the component and another component. Conversely, when a component is referred to as being "directly connected" or "directly coupled" to another component, it should be understood that still another component may not be present between the component and another component.

Unless the context clearly dictates otherwise, the singular form includes the plural form.

Hereinafter, an umbrella storage apparatus for a vehicle according to exemplary embodiments of the present disclosure will be described with reference to the accompanying drawings.

Figure 2:
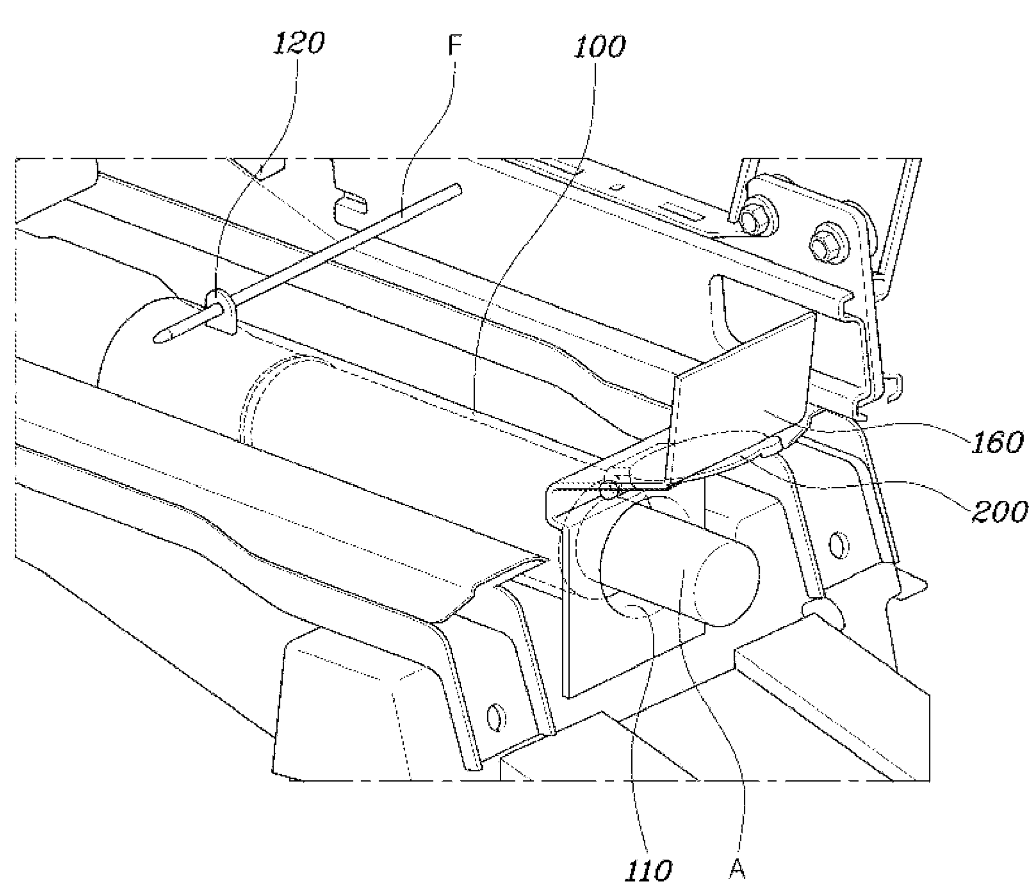
FIG. 2 is a diagram illustrating an umbrella unloading state of the umbrella storage apparatus for a vehicle shown in FIG. 1.
Figure 3:
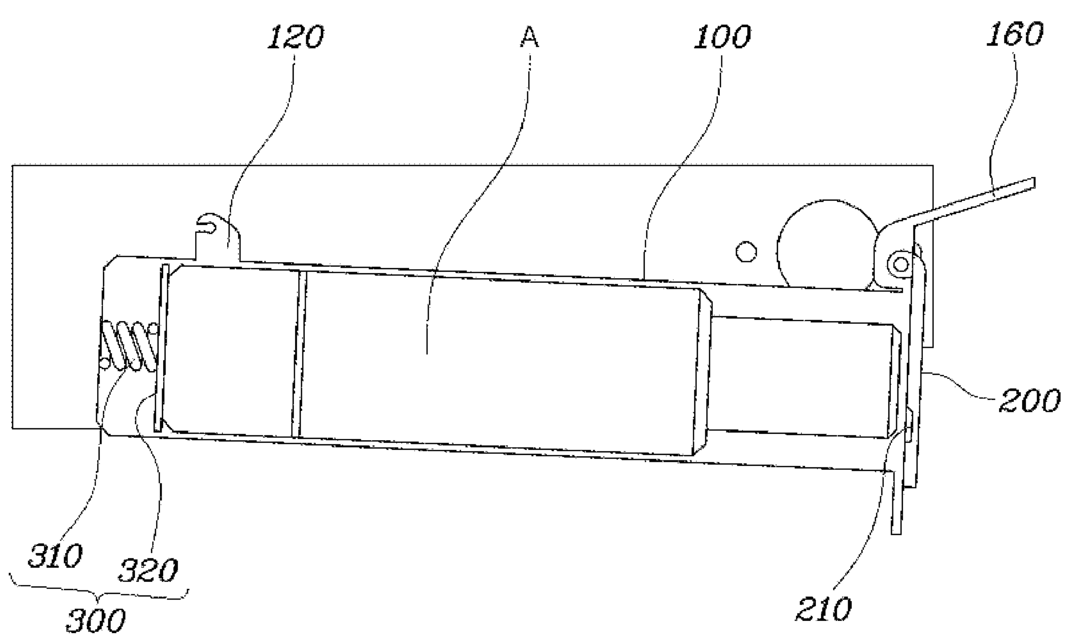
FIG. 3 is a side cross-sectional view illustrating the umbrella storage apparatus for a vehicle shown in FIG. 1.
Figure 4:
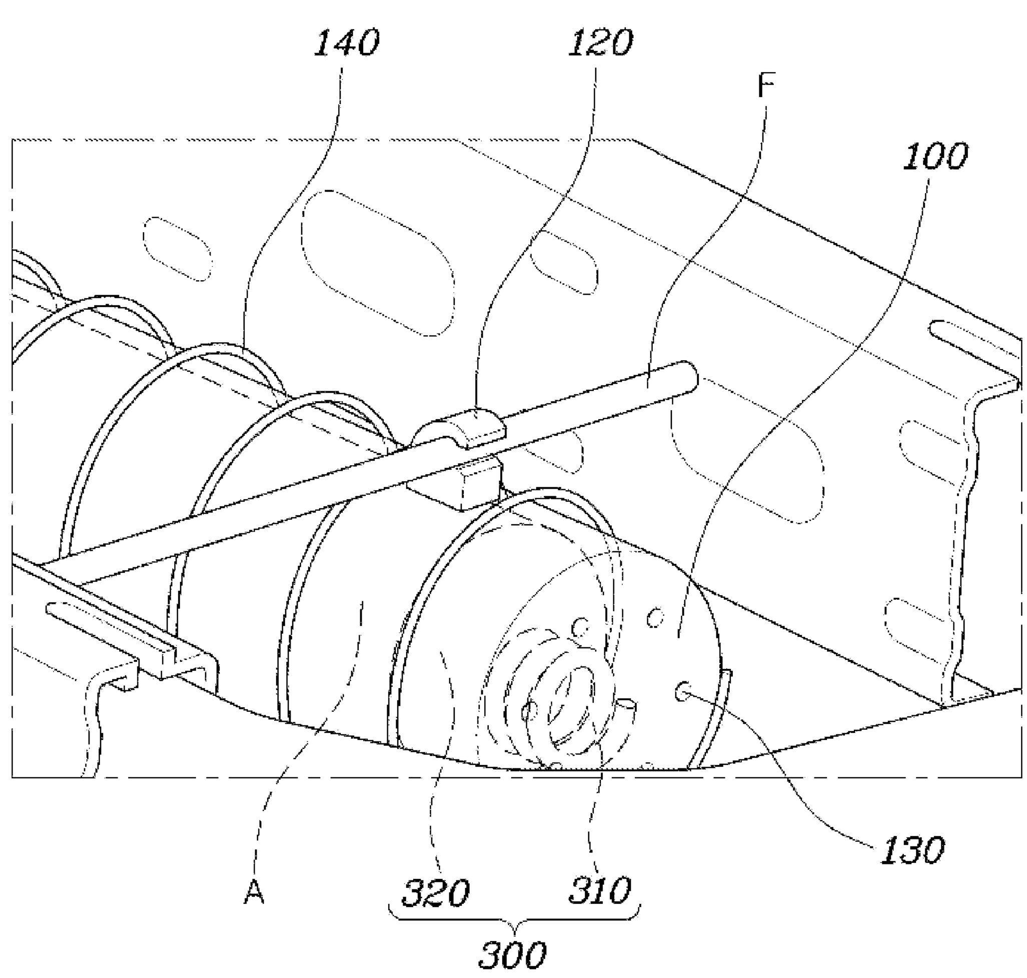
FIG. 4 is a diagram illustrating a state in which the umbrella storage apparatus for a vehicle shown in FIG. 1 is installed at a seat.

FIG. 1 is a diagram illustrating an umbrella storage apparatus for a vehicle according to an embodiment of the present disclosure, FIG. 2 is a diagram illustrating an umbrella unloading state of the umbrella storage apparatus for a vehicle shown in FIG. 1, FIG. 3 is a side cross-sectional view illustrating the umbrella storage apparatus for a vehicle shown in FIG. 1, and FIG. 4 is a diagram illustrating a state in which the umbrella storage apparatus for a vehicle shown in FIG. 1 is installed at a seat.

Figure 5:
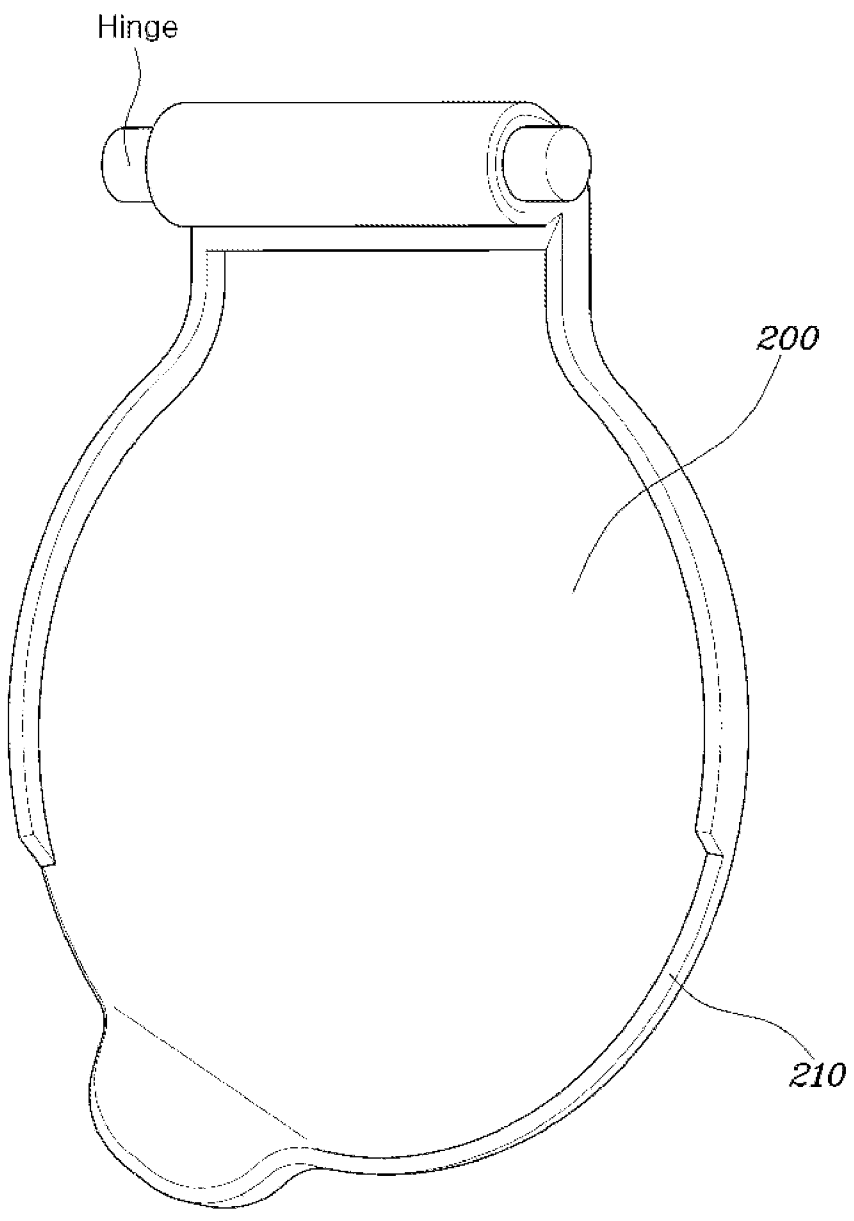
FIG. 5 is a diagram illustrating a cover according to the present disclosure.
Figure 6:
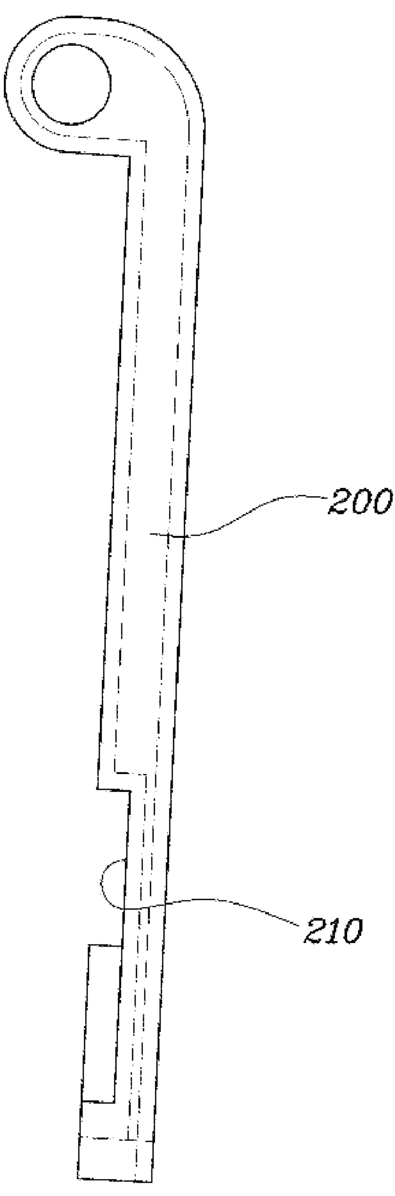
FIG. 6 is a side view illustrating the cover according to the present disclosure.
Figure 7:
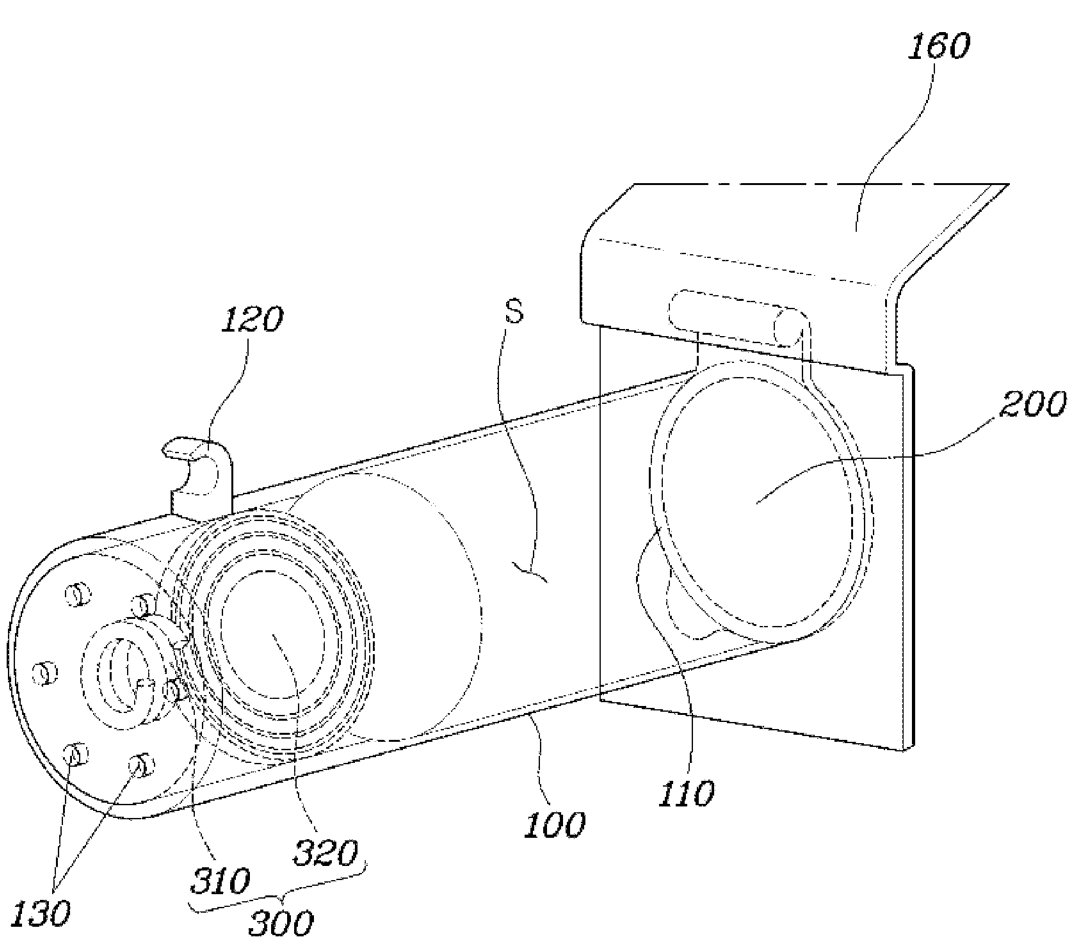
FIG. 7 is a diagram illustrating an interior of a housing according to the present disclosure.
Figure 8:
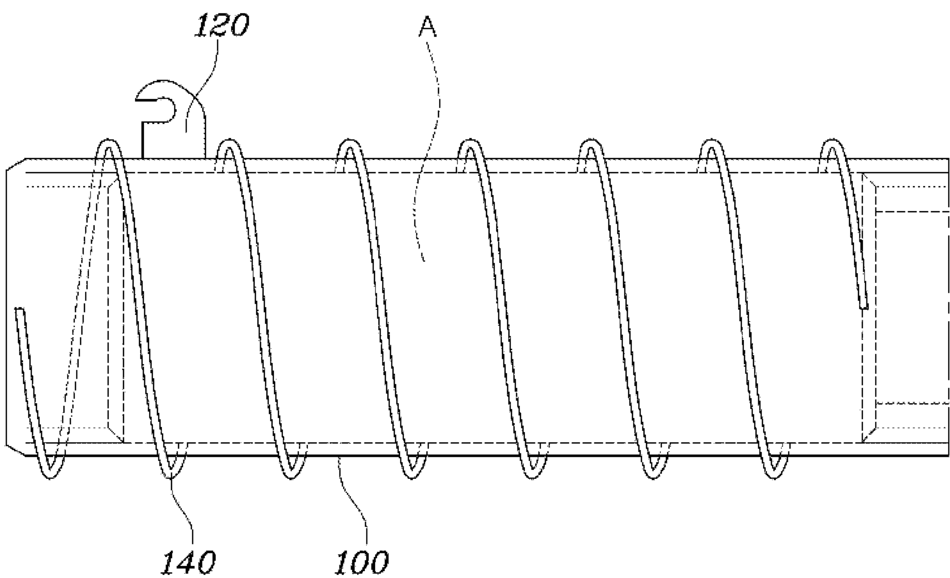
FIG. 8 is a diagram illustrating a heater of the housing according to the present disclosure.
Figure 9:
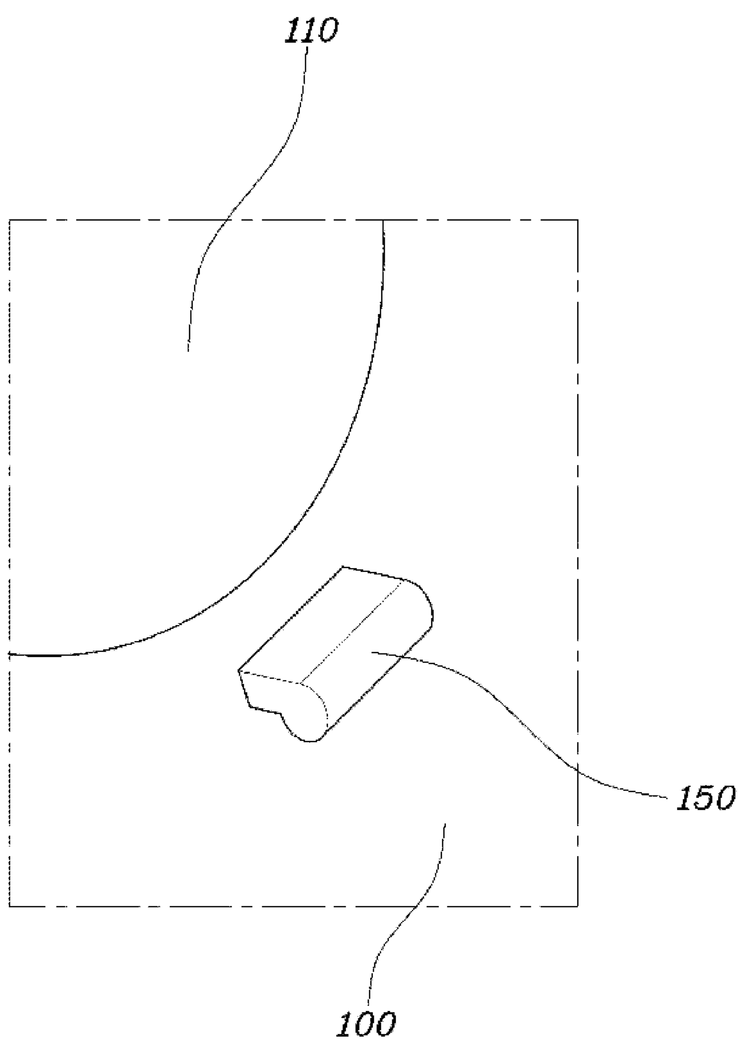
FIG. 9 is a diagram illustrating a fixing device of the housing according to the present disclosure.
Figure 10:
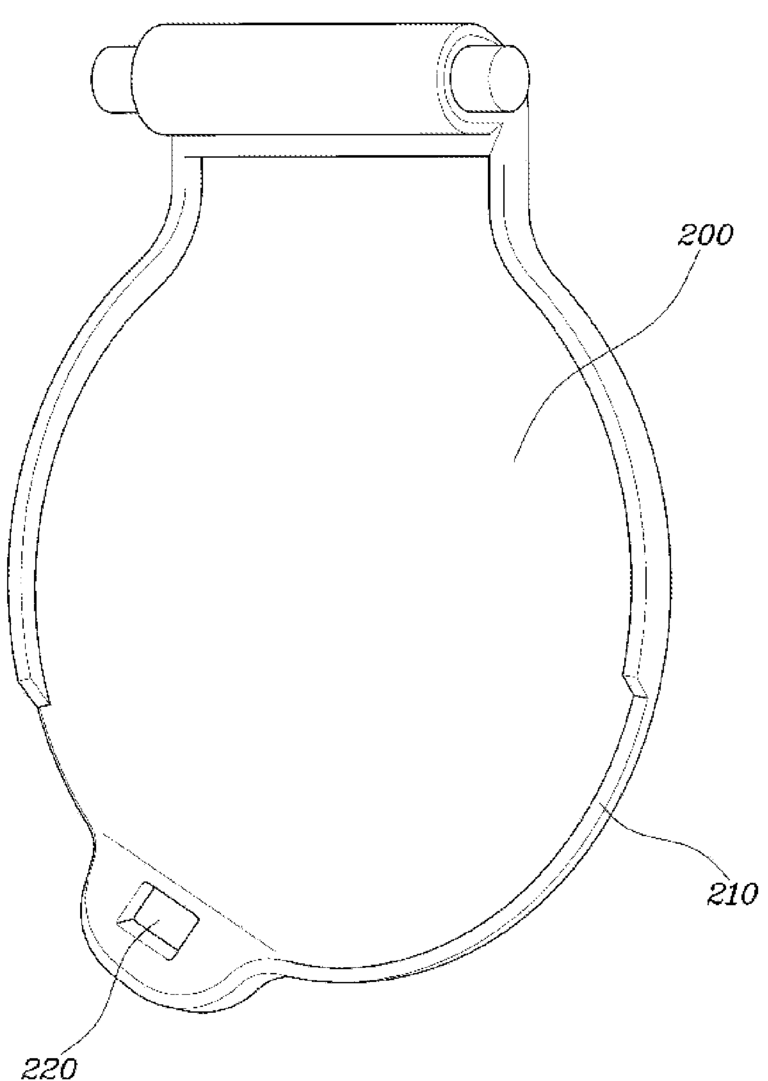
FIG. 10 is a diagram illustrating a fastening device of the cover according to the present disclosure.
Figure 11:
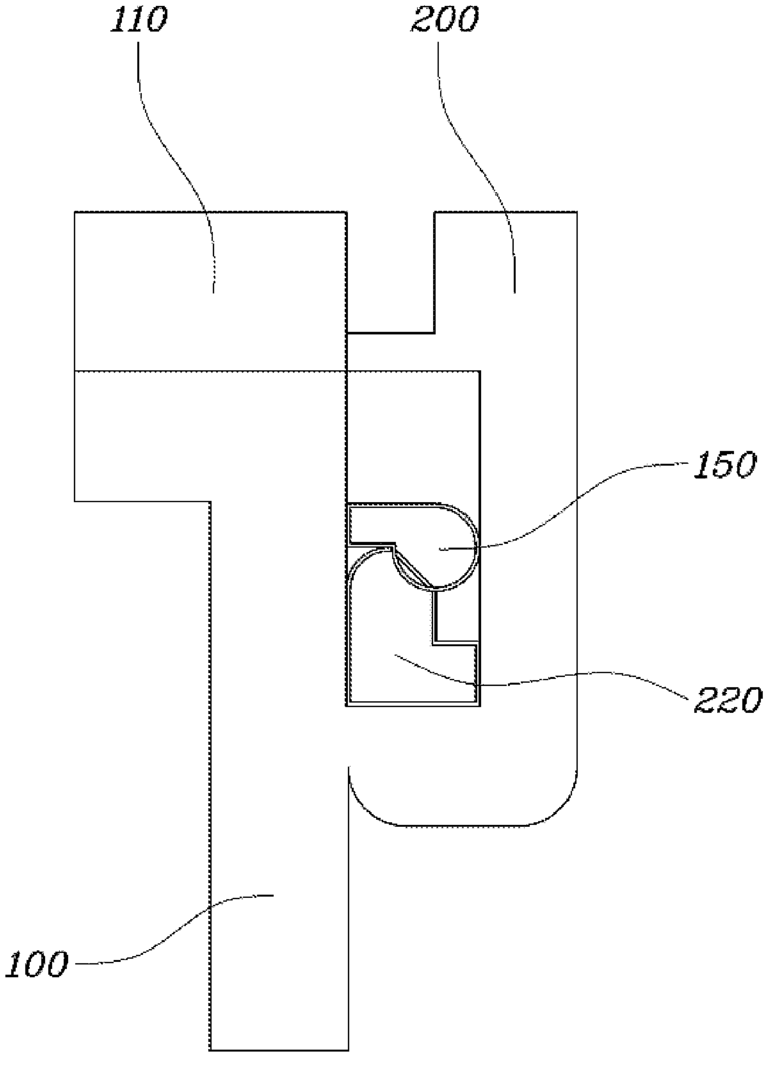
FIG. 11 is a diagram illustrating a fixed state of the housing and the cover according to the present disclosure.
Figure 12:
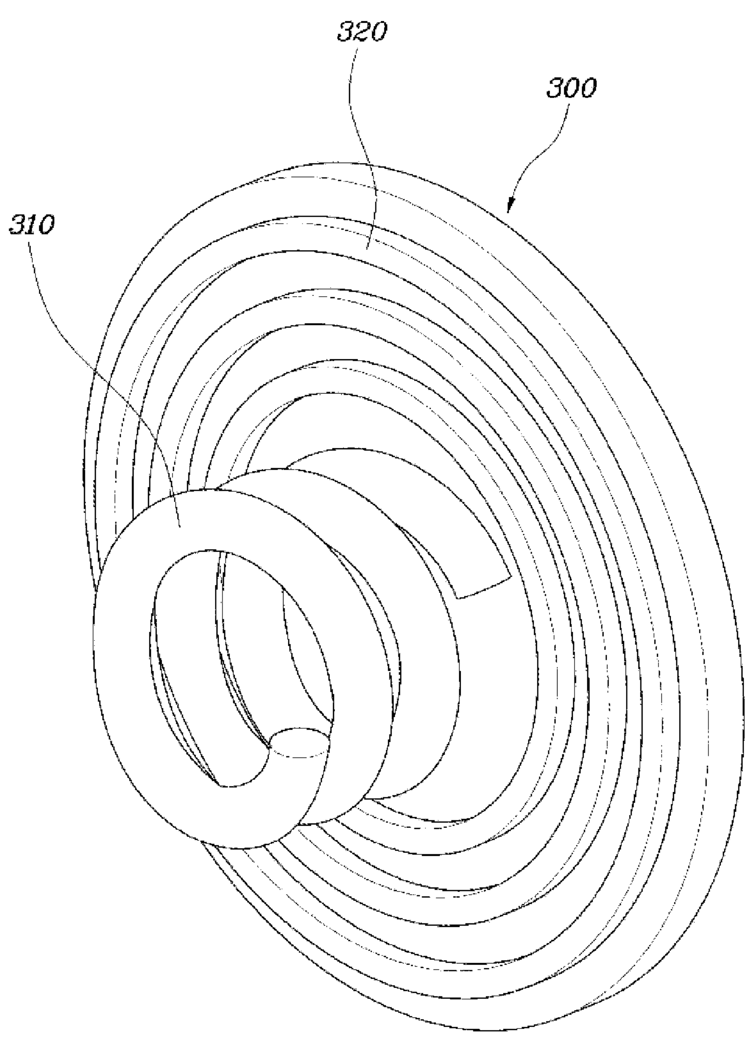
FIG. 12 is a diagram illustrating an ejection unit of the present disclosure.

In addition, FIG. 5 is a diagram illustrating a cover according to the present disclosure, FIG. 6 is a side view illustrating the cover according to the present disclosure, FIG. 7 is a diagram illustrating an interior of a housing according to the present disclosure, FIG. 8 is a diagram illustrating a heater of the housing according to the present disclosure, FIG. 9 is a diagram illustrating a fixing device of the housing according to the present disclosure, FIG. 10 is a diagram illustrating a fastening device of the cover according to the present disclosure, FIG. 11 is a diagram illustrating a fixed state of the housing and the cover according to the present disclosure, and FIG. 12 is a diagram illustrating an ejection unit of the present disclosure.

As shown in FIGS. 1 to 3, the umbrella storage apparatus for a vehicle according to the present disclosure includes a housing 100 which is provided in an interior of the vehicle and provided with a loading space S for storing an umbrella A (or other personal belongings, accessory, or baggage, for example), and in which an opening 110 communicating with the loading space S is formed, a cover 200 installed in the housing 100 and configured to open or close the opening 110, and an ejection unit 300 provided in the loading space S of the housing 100 and configured to elastically support the stored umbrella A to be unloaded toward the opening 110.

The housing 100 may be provided in an interior of the vehicle. As provided herein, the vehicle may be any type of vehicle, including a mobility vehicle (or mobility) or other form of personal transportation. That is, the housing 100 is a space facing the opening 110 of the housing 100 and including a lower portion of the seat or a console and may be provided in a place where a space equal to a length of the loading space S is secured.

That is, the housing 100 may be provided in an unused space in the interior of the vehicle and may be embedded in a lower portion of a seat or a console to minimize exposure to the outside. In addition, the housing 100 is provided in a space which faces the opening 110 and in which a space equal to the length of the loading space S is secured. Thus, the umbrella A in the loading space S may be unloaded without interfering with other structures.

In the present disclosure, the umbrella A may be an umbrella, a foldable umbrella may be applied as the umbrella, and thus a size of the housing 100 may be reduced.

A mounting device 120 connected to a seat frame F is provided in the housing 100 so that the housing 100 may be moved together with the seat in a state of being mounted on the seat frame F by the medium of the mounting device 120.

As shown in FIG. 4, when the housing 100 is provided in the lower portion of the seat, the housing 100 may be mounted on the seat frame F. To this end, the mounting device 120 with a caught structure may be formed in the housing 100, and the mounting device 120 may be connected to the seat frame F and moved together therewith. In this way, the housing 100 is easily mounted on the seat frame F through the mounting device 120, and since the housing 100 is moved together with the seat frame F, even when the seat frame F is moved, the housing 100 may maintain a position that is not exposed below the seat.

Thus, the housing 100 is provided at a place where exposure to the outside is minimized from the interior of the vehicle, and the housing 100 is provided with the loading space S in which the umbrella A is loaded. In addition, an opening 110 communicating with the loading space S is formed in the housing 100, and thus the umbrella A may be loaded or unloaded through the opening 110. In the present disclosure, since the umbrella A is in the form of an umbrella, the loading space S may have a form extending in a straight line to allow the umbrella to be loaded.

The cover 200 for opening or closing the opening 110 is provided in the housing 100, and the ejection unit 300 for ejecting the loaded umbrella A is embedded in the loading space S.

The cover 200 is provided to selectively cover the opening 110 in the housing 100, and a rotating or sliding structure may be applied to the cover 200.

The ejection unit 300 is embedded in the loading space S of the housing 100 and may be positioned on a side opposite to the opening 110. When the umbrella A is loaded in the loading space S of the housing 100, the ejection unit 300 elastically supports the umbrella A to allow the umbrella A to be ejected toward the opening 110.

Thus, as can be seen in FIG. 1, when the opening 110 is closed using the cover 200 in a state in which the umbrella A is inserted into the loading space S of the housing 100, a storage state according to which the umbrella A is provided in the loading space S may be realized.

Here, as can be seen in FIG. 2, when the cover 200 opens the opening 110, the ejection unit 300 pushes the umbrella A provided in the loading space S using an elastic force so that the umbrella A may be unloaded through the opening 110. In this case, when the ejection unit 300 ejects the umbrella A from the loading space S, the ejection unit 300 ejects the umbrella A to such an extent that only a portion of the umbrella A is exposed in the loading space S so that the user checks whether to use the umbrella A and directly unloads the umbrella A fully.

In this way, according to the present disclosure, the umbrella A is stored in the housing 100 provided at the lower portion of the seat, and the umbrella A is ejected by the ejection unit 300 when the user opens the cover 200 according to whether to use the umbrella A so usage convenience of the umbrella A of the user is improved. In addition, by utilizing the lower portion of the seat, which is an unused space in the interior, to store an umbrella that is the umbrella A, utilization of the interior space can be secured, and the umbrella can be used in the interior so the user can go outside using the umbrella without getting hit by the rain.

Meanwhile, as shown in FIG. 3, the loading space S of the housing 100 may be formed to be inclined toward the opening 110. That is, when the housing 100 is mounted in the interior, the housing 100 may be installed to be inclined or the loading space S may be formed to be inclined in the housing 100.

Thus, when water moisture is generated in the loading space S of the housing 100, the water moisture flows down toward the opening 110 according to an inclination of the loading space S and is discharged to the outside so that contamination and odor generation due to accumulation of the water moisture in the loading space S is prevented.

Meanwhile, as can be seen in FIGS. 3, 5, and 6, the cover 200 may be rotatably installed at the housing 100 excluding a lower end of the opening 110 and may be formed to cover the opening 110.

In this way, the cover 200 may be rotatably installed by being hinge-coupled to the housing 100 and may be installed, for operation convenience of the user, at an upper end of the opening 110 of the remaining portion of the opening 110 excluding the lower end.

In addition, since the cover 200 is installed on the upper end of the opening 110, when the water moisture flows down from the loading space S and is discharged, durability degradation due to transfer of the water moisture to a connection portion between the cover 200 and the housing 100 can be prevented.

The cover 200 may be formed to match the opening 110 of the housing 100 to prevent an inside of the loading space S from being exposed when the opening 110 is closed.

An additional opening 210 is formed at a lower end of the cover 200, and even when the cover 200 closes the opening 110, the loading space S may be opened to the outside through the additional opening 210.

Here, when the cover 200 closes the opening 110, the additional opening 210 may correspond to where the lower end of the cover 200 is cut to allow the cover 200 to be spaced apart from the housing 100 without coming into contact therewith. Alternatively, the additional opening 210 may be formed in the form of a hole at the lower end of the cover 200.

In this way, even when the cover 200 closes the opening 110, the water moisture in the loading space S may be discharged to the outside through the additional opening 210.

Meanwhile, as shown in FIG. 7, a plurality of air flow holes 130 may be formed on the side opposite to the opening 110 in the housing 100. The air flow hole 130 allows the loading space S of the housing 100 to communicate with the interior so that air may circulate into the loading space S of the housing 100 through the air flow hole 130.

In this way, in the housing 100, since the air circulates in the loading space S, a pressure in the loading space S is distributed so that an ejection operation of the umbrella A may be smoothly performed by the ejection unit 300. In addition, since the air circulates in the loading space S of the housing 100 through the air flow holes 130, when water moisture is generated in the loading space S, the air circulates to facilitate removal of the water moisture.

Meanwhile, as shown in FIG. 8, a heater 140 is further provided in the housing 100, and the heater 140 may be provided to surround the loading space S and may operate to generate heat, thereby providing the heat to the loading space S.

The heater 140 may be composed of a positive temperature coefficient (PTC) thermistor and provided to cover an outer circumference of the housing 100. The heater 140 may be provided in the loading space S, but when the heater 140 is provided in the loading space S, the umbrella A may be damaged due to the heat from the heater 140.

The heater 140 may raise a temperature of the loading space S through heat conduction by generating heat during operation, and when the temperature of the loading space S rises, evaporation of the water moisture is induced so that the water moisture may be removed.

In this way, through the above-described structure, when the umbrella A that is an umbrella is stored in the loading space S, contamination and odor generation due to the water moisture are prevented so that user satisfaction can be improved when the umbrella stored in the loading space S is reused in the future.

Meanwhile, as shown in FIGS. 9 to 11, a fixing device 150 may be formed around the opening 110 in the housing 100, and a fastening device 220 may be formed in the cover 200 and connected to the fixing device 150 when the cover 200 is positioned to close the opening 110.

A caught structure may be applied to the fixing device 150 of the housing 100 and the fastening device 220 of the cover 200. Thus, the fixing device 150 and the fastening device 220 are each formed in a hook shape, and when the cover 200 is positioned to close the opening 110 of the housing 100, the fixing device 150 and the fastening device 220 may be caught with each other to maintain a closed position of the cover 200.

Alternatively, magnets are applied to the fixing device 150 and the fastening device 220, and when the cover 200 is positioned to close the opening 110, the fixing device 150 and the fastening device 220 may be connected to each other to maintain the closed position of the cover 200.

The above connection and disconnection structure of the fixing device 150 and the cover 200 may be applied in various ways.

Meanwhile, as can be seen in FIG. 2, the cover 200 may be rotatably installed on the housing 100 and installed to be elastically rotated in a direction for opening the opening 110.

A spring may be applied to the cover 200, and thus an elastic force may be applied in a direction in which the cover 200 is opened. Consequently, when the cover 200 is operated in the direction for opening the opening 110, the cover 200 is elastically rotated so that operating convenience of the opening 110 is improved.

In addition, a contact device 160 is formed at the housing 100 in the direction in which the cover 200 is opened so that an opened position of the cover 200 may be limited only to a position where the cover 200 comes into contact with the contact device 160.

The contact device 160 may be formed in contact with the cover 200 when the cover 200 is positioned to open the opening 110 around the opening 110 of the housing 100. Due to the contact device 160, the opened position of the cover 200 is limited to only the position in contact with the contact device 160 so that the cover 200 is prevented from coming into contact with other parts due to an excessive rotation, and re-operation of the cover 200 switched to the opened position is facilitated.

Meanwhile, as shown in FIGS. 7 and 12, the ejection unit may be provided on the side opposite to the opening 110 in the loading space S of the housing 100 and may include an elastic member 310 and a support 320.

The elastic member 310 may be formed of a spring, and the support 320 may be formed to fit an inner circumferential shape of the loading space S. In addition, in order to allow the support 320 to be moved only in a straight line in the loading space S, a sliding structure through a groove and a protrusion may be applied to the housing 100.

In this way, when the umbrella A is loaded into the loading space S of the housing 100, the support 320 is pushed by the umbrella A to pressurize the elastic member 310, and the cover 200 closes the opening 110 so that the elastic member 310 is maintained in a compressed state.

Here, when the cover 200 opens the opening 110, the umbrella A is pushed by an elastic force of the elastic member 310 together with the support 320 so that the umbrella A may be automatically unloaded through the opening 110.

The umbrella storage apparatus for a vehicle, which has the above-described structure, can maintain the aesthetically pleasing feeling of the interior (e.g., by providing a space to store and/or hide an umbrella) and secure utilization of the interior space by utilizing an unused space of the interior to store the umbrella.

In addition, inconvenience and/or contamination due to exposed water moisture can be prevented through discharge and evaporation of the water moisture generated during storage of the umbrella.

Although the specific embodiments of the present disclosure have been described and illustrated, those skilled in the art will appreciate that various alternations and modifications are possible without departing from the technical spirit of the present disclosure provided in the appended claims.

What is claimed is:

1. An umbrella storage apparatus for a vehicle, comprising:

a housing provided in an interior of the vehicle and equipped with a loading space for storing an umbrella or other accessory, the housing including an opening for communicating with the loading space;

a cover installed on the housing and configured to open or close the opening; and an ejection unit configured to elastically support the stored umbrella to be unloaded toward the opening, wherein an additional opening is formed at a lower end of the cover, and even when the cover closes the opening, the loading space is opened to the outside through the additional opening.

2. The umbrella storage apparatus of claim 1, wherein the ejection unit is provided in the loading space of the housing.

3. The umbrella storage apparatus of claim 1, wherein the housing is provided in a lower portion of a seat of the vehicle.

4. The umbrella storage apparatus of claim 1, wherein the housing is provided at a place in the vehicle including a console.

5. The umbrella storage apparatus of claim 4, wherein the housing includes a space that faces an opening, and is equal in length the loading space.

6. The umbrella storage apparatus of claim 1, wherein the housing includes a mounting device connected to a seat frame, the mounting device configured to be moved together with a seat in a state of being mounted on the seat frame.

7. The umbrella storage apparatus of claim 1, wherein the loading space of the housing is formed to be inclined toward the opening.

8. The umbrella storage apparatus of claim 1, wherein the cover is rotatably installed on the housing, excluding a lower end of the opening and is formed to cover the opening.

9. The umbrella storage apparatus of claim 1, wherein the housing includes a plurality of air flow holes formed on a surface opposite to the opening.

10. The umbrella storage apparatus of claim 1, further comprising a heater provided in the housing.

11. The umbrella storage apparatus of claim 10, wherein the heater is provided to surround the loading space and is operated to generate and provide heat to the loading space.

12. The umbrella storage apparatus of claim 1, wherein:

a fixing device is formed around the opening in the housing; and a fastening device is formed at the cover to be connected to the fixing device when the cover is positioned to close the opening.

13. The umbrella storage apparatus of claim 1, wherein the cover is rotatably installed at the housing and installed to be elastically rotated in a direction of the opening.

14. The umbrella storage apparatus of claim 13, wherein a contact device is formed at the housing in a direction in which the cover is opened.

15. The umbrella storage apparatus of claim 14, wherein an opened position of the cover is limited only to a position in contact with the contact device.

16. The umbrella storage apparatus of claim 1, wherein the ejection unit is provided on a side opposite to the opening in the loading space of the housing.

17. The umbrella storage apparatus of claim 16, wherein the ejection unit includes an elastic member and a support.

18. A vehicle comprising the umbrella storage apparatus of claim 1.

19. A mobility comprising the umbrella storage apparatus of claim 1.

* * * * *